(12) United States Patent
Jehle et al.

(10) Patent No.: US 11,047,475 B2
(45) Date of Patent: Jun. 29, 2021

(54) METHOD AND CONTROL UNIT FOR OPERATING A TRANSMISSION COMPRISING AT LEAST ONE FORM-LOCKING SHIFT ELEMENT

(71) Applicant: ZF Friedrichshafen AG, Friedrichshafen (DE)

(72) Inventors: Martina Jehle, Kressbronn (DE); Christian Pannek, Friedrichshafen (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 0 days.

(21) Appl. No.: 16/700,774

(22) Filed: Dec. 2, 2019

(65) Prior Publication Data
US 2020/0173545 A1 Jun. 4, 2020

(30) Foreign Application Priority Data
Dec. 3, 2018 (DE) ...................... 10 2018 220 871.9

(51) Int. Cl.
*F16H 61/12* (2010.01)
*F16H 63/36* (2006.01)
*F16H 63/30* (2006.01)

(52) U.S. Cl.
CPC ......... *F16H 61/12* (2013.01); *F16H 63/3069* (2013.01); *F16H 63/36* (2013.01);
(Continued)

(58) Field of Classification Search
CPC ...... F16H 61/12; F16H 63/36; F16H 63/3069; F16H 2061/1284; F16H 2061/1204;
(Continued)

(56) References Cited

U.S. PATENT DOCUMENTS 4,779,490 A * 10/1988 Milunas ................. F16H 59/36
477/115
5,157,607 A 10/1992 Stainton et al.
(Continued)

FOREIGN PATENT DOCUMENTS

DE 69007458 T2 9/1994
DE 102005002337 A1 8/2006
(Continued)

OTHER PUBLICATIONS

German Search Report DE102018220871.9, dated Oct. 10, 2019. (12 pages).

*Primary Examiner* — Justin Holmes
(74) *Attorney, Agent, or Firm* — Dority & Manning, P.A.

(57) ABSTRACT

A method for operating a transmission (3) that includes at least one form-locking shift element (A, F) with two shift-element halves is provided. The shift element (A, F) is disengaged in a first end position and is engaged in a second end position of a displaceable shift-element half. Upon detection of a sensor malfunction, a check is carried out to determine whether the shift-element half, before the malfunction of the sensor, was in an end position as demanded and was actuated by an actuation force acting in the direction of this end position. Power flow in the transmission (3) is maintained for as long as it takes for the shift-element half, starting from the current end position, to be actuated in the direction of the other end position and/or for the actuation force acting in the direction of the current end position to be less than a threshold value.

8 Claims, 3 Drawing Sheets

(52) U.S. Cl.
CPC .............. *F16H 2061/1204* (2013.01); *F16H 2061/1284* (2013.01)

(58) Field of Classification Search
CPC ......... F16H 2061/047; F16H 2061/122; F16H 2003/442; F16H 3/66; F16H 2200/0065; F16H 2200/2012; F16H 2200/2046; F16H 2200/2064; F16H 2200/2094; F16H 61/0213; F16H 61/686; F16H 2061/124; F16H 2061/0244
See application file for complete search history.

(56) References Cited

U.S. PATENT DOCUMENTS

| | | | |
|---|---|---|---|
| 7,789,792 B2 | 9/2010 | Kamm et al. | |
| 8,398,522 B2 | 3/2013 | Bauknecht et al. | |
| 8,812,200 B2 | 8/2014 | Novak | |
| 2009/0121708 A1* | 5/2009 | Lackey | F16H 59/68 324/207.2 |
| 2017/0350502 A1* | 12/2017 | Lee | F16H 63/42 |

FOREIGN PATENT DOCUMENTS

| | | |
|---|---|---|
| DE | 102008000429 A1 | 9/2009 |
| DE | 102012202903 A1 | 8/2013 |

* cited by examiner

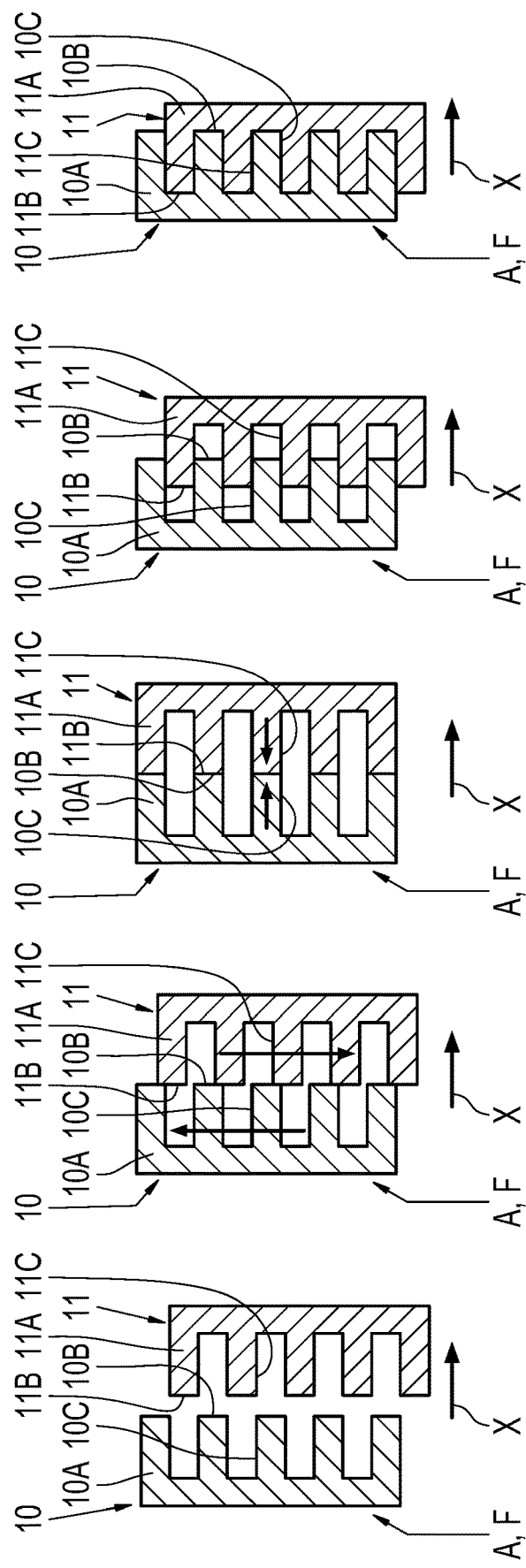

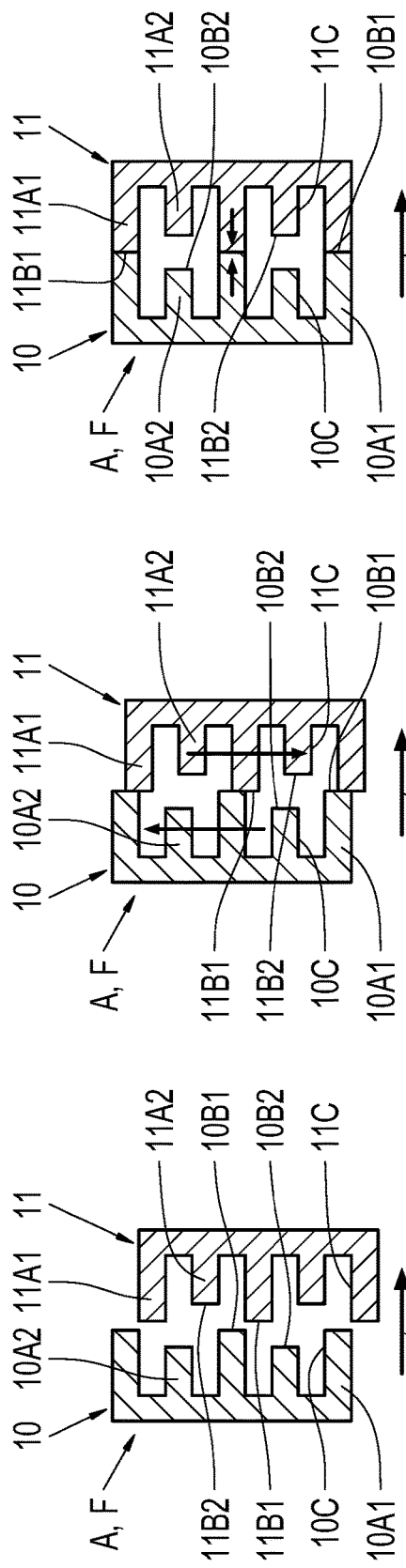

METHOD AND CONTROL UNIT FOR OPERATING A TRANSMISSION COMPRISING AT LEAST ONE FORM-LOCKING SHIFT ELEMENT

CROSS-REFERENCE TO RELATED APPLICATION

The present application is related and has right of priority to German Patent Application No. 10 2018 220 871.9 filed on Dec. 3, 2018, the entirety of which is incorporated by reference for all purposes.

FIELD OF THE INVENTION

The invention relates generally to a method for operating a transmission including at least one form-locking shift element. Moreover, the invention relates generally to a control unit for carrying out the method as well as to a corresponding computer program.

BACKGROUND

DE 10 2005 002 337 A1 describes an eight-speed multi-stage transmission that includes friction-locking shift elements. The shift elements are multi-disk clutches or multi-disk brakes. In the presence of a shift request for a ratio change in the transmission, at least one of the friction-locking shift elements is to be disengaged from the power flow of the transmission device and at least one further friction-locking shift element is to be engaged into the power flow of the transmission device, in order to transmit a torque.

In general, in the presence of a demand to disengage a friction-locking shift element, regardless of the torque presently transmitted via the friction-locking shift element, it is assumed that the friction-locking shift element is actually transitioning into the disengaged operating condition. To the same extent, a demand to engage a friction-locking shift element is also implementable using comparatively little outlay for open-loop and closed-loop control.

For this reason, a simple software-based evaluation of an actuating current of a pressure regulator of a friction-locking shift element is sufficient. During the determination of an appropriate disengagement control signal or an appropriate engagement control signal for transferring the friction-locking shift element into its disengaged operating condition or its engaged operating condition, respectively, it can be easily verified whether a shift change or gearchange was successful via such an evaluation.

Disadvantageously, however, friction-locking shift elements in the disengaged operating condition cause drag torques, which adversely affect an overall efficiency of an automatic transmission to an undesirable extent.

For this reason, transmission devices, such as those described in DE 10 2008 000 429 A1, increasingly include not only friction-locking shift elements but also form-locking shift elements. These types of form-locking shift elements usually include two shift-element halves. The shift-element halves are brought into form-locking engagement with each other via axial displacement of at least one movable shift-element half with respect to the other shift-element half, which is not axially displaceable, at dog elements, or the like. Thereupon, the form-locking shift element is engaged and transmits an applied torque. Moreover, it is also possible that both shift-element halves are axially movable with respect to each other.

If the form-locking shift element is to be disengaged from the power flow, the positive engagement between the shift-element halves is disengaged via axial displacement of the movable shift-element half with respect to the axially fixed shift-element half. Form-locking shift elements are used because, in contrast to friction-locking shift elements, essentially no drag torques occur with disengaged form-locking shift elements. Drag torques adversely affect the overall efficiency of a transmission. However, form-locking shift elements, as compared to friction-locking shift elements, are transferable out of a disengaged operating condition, in which no torque is transmitted via the form-locking shift elements, into their engaged operating condition only close to their synchronous speed.

Additionally, form-locking shift elements engaged into the power flow of a transmission device are disengageable from the power flow or transferable into their disengaged operating condition using low shifting forces if the applied torque has an appropriately low value. During gear change operations or gear disengagement operations, a power flow between a transmission input shaft and a transmission output shaft is interrupted in the transmission. In this case, a form-locking shift element is to be transferred, if necessary, from its engaged operating condition into its disengaged operating condition. Due to an excessively rapid or faulty build-up of the torque applied at the form-locking shift element, or due to a faulty reduction of the applied torque, the form-locking shift element may not be transferrable into its disengaged operating condition. In addition, it is also possible that mechanical, hydraulic, or electrical malfunctions prevent the disengagement of a form-locking shift element. For this reason, form-locking shift elements, in contrast to friction-locking shift elements, do not necessarily transition into a disengaged operating condition in the presence of an appropriate disengagement control signal.

Additionally, it is also possible that a disengaged form-locking shift element is not transferable into its engaged operating condition within desirably short operating times. This is the case, for example, when the sought positive engagement between the shift-element halves cannot be established due to a so-called tooth-on-tooth position. In the event of such a tooth-on-tooth position, dog elements of the shift-element halves rest against one another at their end faces and the differential speed between the shift-element halves is zero. Such a tooth-on-tooth position is released only when a torque present at the form-locking shift element is greater than the static friction torque between the end faces of the dog elements of the shift-element halves.

Moreover, the establishment of a complete positive engagement between the shift-element halves or the complete engagement of a form-locking shift element is also preventable by a so-called flank clamping between the flanks of the dog elements. In the event of such a flank clamping, the two shift element halves have an axial overlap of their dog elements. However, the static friction between the flanks of the dog elements of the shift-element halves, which are resting against one another, is so high that the engagement force acting on the shift elements in the engagement direction is not sufficient to overcome the static friction and completely engage the form-locking shift element.

Sensors are installed in order to be able to monitor the current operating condition of a form-locking shift element. These sensors include, for example, a permanent magnet and a measuring unit for sensing the magnetic field of the permanent magnet. Additionally, the sensors have a ferromagnetic sensor contour, which influences the magnetic field of the permanent magnet depending on the operating conditions of the shift-element halves. Various magnetic field-sensing elements are known, such as magnetoresistive sensors Hall effect sensors. Magnetic field sensors generally include elements sensing a magnetic field or other electronic components, wherein some magnetic field sensors include permanent magnets in a back-biased arrangement.

These types of magnetic field sensors provide electrical signals, which represent the condition of a sensed magnetic field. Some magnetic field sensors cooperate with ferromagnetic objects. With the aid of the magnetic field sensors, magnetic field fluctuations are determined, which are caused by an object moved through the magnetic field of a magnet of a magnetic field sensor. The magnetic field monitored with the aid of the magnetic field sensor also varies depending on a shape or a profile of the moving ferromagnetic object. The position determination of the shift-element halves is calculated directly from the raw signals of the sensors with the aid of applicable thresholds.

The values of the sensor signal have a non-negligible scattering, which does not allow for a precise determination of a current dog position. For this reason, a value range of the sensor signal is utilized in each case for the determination, by the sensor, of a current dog position, which is delimited for the relevant dog position by the particular maximum sensor signal that has been received and by the minimum sensor signal that has been received. Additionally, the values of the signal of such a sensor also vary depending on a position change of the overall form-locking shift element of a transmission with respect to the sensor. Such a position change results from so-called gear clearance, which varies depending on the particular torque to be transmitted via the transmission and depending on manufacturing tolerances of the transmission and of the form-locking shift element.

If a malfunction of the sensors is detected on the basis of the raw signals of the sensors, the power flow in the transmission is interrupted in known transmission systems. For this purpose, all shift elements are abruptly transferred into their disengaged operating condition, for example, in the case of a transmission of the type described above. As a result, an actuation routine retrieved via the software due to an erroneously determined operating condition of a form-locking shift element does not cause a potentially overspecified operating condition of the transmission or damage the form-locking shift element.

It is disadvantageous in this case, however, that very short electrical malfunctions can already cause a complete disengagement of the transmission. If an operation of the sensor as specified is subsequently detected again, in the least favorable case in the transmission of the type described above, two form-locking shift elements are to be transferred into their engaged operating condition. The engagement of the two form-locking shift elements is highly time-consuming due to the engagement strategy necessary therefor. For this reason, the transmission is available again for an operation only after undesirably long operating times have elapsed.

SUMMARY OF THE INVENTION

Starting from the above-described background, example aspects of the invention provide a method for operating a transmission that includes at least one form-locking shift element, with the aid of which a probability of failure of a transmission can be reduced. Additionally, a control unit, which is designed for carrying out the method, and a computer program for carrying out the method are provided.

A method is provided for operating a transmission that includes at least one form-locking shift element, which includes two shift-element halves. At least one shift-element half is designed to be displaceable between two end positions. The shift element is disengaged in the first end position of the shift-element half and is engaged in the second end position. The actuating travel of the shift-element half is detected with the aid of a sensor. A power flow in the transmission is interrupted if a malfunction of the sensor is detected.

In the present case, for example, constant-mesh shift elements or dog clutches, which transmit a torque via a form-locking connection, are described herein under the term "form-locking shift element". Moreover, shift elements, which transmit a torque via a friction-locking connection, including clutches or brakes are described herein under the term "friction-locking shift element. The torque transmittable with the aid of such a friction-locking shift element varies depending on the particular engagement force applied to the friction-locking shift element and is preferably infinitely variable. The engagement force corresponds, for example, to a hydraulic pressure applied to the shift element. In contrast thereto, the torque transmittable with the aid of a form-locking shift element is not infinitely variable.

Example aspects of the invention disclose that a check is carried out, upon detection of a malfunction of the sensor, to determine whether the shift-element half, before the malfunction, was in an end position as demanded and was actuated with the aid of an actuation force acting in the direction of this end position. In the event of a positive test result, the power flow in the transmission is maintained for as long as it takes for the shift-element half, starting from the current end position, to be actuated in the direction of the other end position and/or for the actuation force acting in the direction of the current end position to be less than a threshold value.

In other words, it is decided, with the aid of the approach according to example aspects of the invention, which information the signal of the sensor delivers and whether it is necessary to disengage the power flow in the transmission due to this information.

If the shift-element half is in the demanded end position up to the point in time at which, for example, an electrical malfunction is detected on the basis of the progression of the signal of the sensor and, up to this point in time, the shift-element half was also actuated in the direction of the demanded end position with the aid of a sufficiently high actuation force, the engaged end position is retained and an interruption of the power flow in the transmission is not necessary.

Therefore, the power flow in the transmission is to be interrupted and an unknown position of the shift-element half is to be displayed only for the case in which the last known position of the shift-element half does not correspond to an end position, the direction of actuation of the shift-element half does not correspond to the direction of the last known position of the shift-element half, or actuation force that is sufficient for the actuation of the shift-element half is not available.

Therefore, the probability that the power flow in the transmission will be interrupted is reduced, in a simple way, as compared to conventionally operated transmissions.

In an advantageous example variant of the method according to the invention, a malfunction of the sensor is detected if a signal of the sensor has values that are outside a value range. The values of the value range correspond to the overall actuating-travel range of the shift-element half between its end positions. Therefore, a malfunction of the sensor can be determined with little outlay for open-loop and closed-loop control.

If the signal of the sensor is a pulse-width modulated signal, a malfunction of the sensor can be determined with little outlay.

If the power flow in the transmission is interrupted and if the malfunction of the sensor persists for longer than a predefined time period, intermittent malfunctions of the sensor are not taken into account, and so an operation of the transmission is adversely affected only in the event of longer malfunctions of the sensor.

Usually, the actuation force applicable at the shift element corresponds to a hydraulic pressure that is made available by a hydraulic pump, which can be driven by a prime mover of a vehicle drive train. In an advantageous example variant of the method according to the invention, the power flow in the transmission is interrupted if the drive torque of the prime mover is less than a threshold value. In this case, it is possible to define the threshold value in such a way that the power flow in the transmission is interrupted in the shutdown operating condition of the prime mover, during which the drive torque is essentially zero.

The invention also relates generally to a control unit, which is designed for carrying out the method according to example aspects of the invention. The control unit includes, for example, means utilized for carrying out the method according to the invention. These means can be hardware-related means and software-related means. The hardware-related means of the control unit or of the control device are, for example, data interfaces for exchanging data with the assemblies of the vehicle drive train contributing to the carrying-out of the method according to example aspects of the invention. Further hardware-related means are, for example, a memory for data storage and a processor for data processing. Software-related means can be, inter alia, program modules for carrying out the method according to example aspects of the invention.

In order to carry out the method according to example aspects of the invention, the control unit can be operated using at least one receive interface, which is designed for receiving signals from signal transmitters. The signal transmitters can be designed, for example, as sensors, which gather measured quantities and transmit them to the control unit. A signal transmitter can also be referred to as a signal sensoring element. In this way, the receive interface can receive a signal from a signal transmitter, via which it is signaled that there is a malfunction of the sensor.

The control unit can also include a data processing unit, in order to evaluate and/or process the received input signals or the information of the received input signals.

The control unit can also be designed including a transmit interface, which is designed for outputting control signals to actuating elements. An actuating element is understood to be actuators that implement the commands of the control unit. The actuators can be designed, for example, as electromagnetic valves.

The control unit is designed for operating a transmission that includes at least one form-locking shift element, which includes two shift-element halves. At least one shift-element half is designed to be displaceable between two end positions. The shift element is disengaged in the first end position of the shift-element half and is engaged in the second end position. The actuating travel of the shift-element half is detected with the aid of a sensor. A power flow is interrupted in the transmission by way of the control unit if the control unit ascertains a malfunction of the sensor on the basis of received input signals.

The control unit is designed in such a way that, upon detection of a malfunction of the sensor on the basis of input signals, a check is carried out to determine whether the shift-element half, before the malfunction, was in its end position as demanded and was actuated with the aid of an actuation force acting in the direction of this end position. In the event of a positive test result, the control unit maintains the power flow in the transmission for as long as it takes for the shift-element half, starting from the current end position, to be actuated in the direction of the other end position and/or for the actuation force acting in the direction of the current end position to be less than a threshold value.

As a result, the probability that the power flow in the transmission is interrupted upon detection of a malfunction of the sensor is reduced in a simple way.

The aforementioned signals are to be considered merely as examples and are not to limit the invention. The gathered input signals and the output control signals can be transmitted via a vehicle bus, for example, via a CAN-BUS. The control device or the control unit can be designed, for example, as a central electronic control unit of the vehicle drive train or as an electronic transmission control unit.

The approach according to example aspects of the invention can also be embodied as a computer program product, which, when running on a processor of a control device, instructs the processor from the software point of view to carry out the assigned method steps, which are subjects of the invention. In this context, a machine-readable medium, on which an above-described computer program product is retrievably stored, is also a subject of the invention.

The invention is not limited to the specified combination of features of the independent claims or the claims dependent thereon. In addition, individual features can be combined with one another, provided they arise from the claims, the description of embodiments that follows, or directly from the drawing. References in the claims to the drawings via the use of reference characters is not intended to limit the scope of protection of the claims.

BRIEF DESCRIPTION OF THE DRAWINGS

Preferred refinements result from the dependent claims and the following description. An exemplary embodiment of the invention is explained in greater detail with reference to the drawing, without being limited thereto. Wherein:

FIG. 3a through FIG. 3e each show various operating conditions of a form-locking shift element, which is represented in a highly schematic manner, between a completely disengaged condition and a completely engaged condition; and FIG. 4a through FIG. 4f each show representations corresponding to FIG. 3a of various operating conditions of a form-locking shift element, whose dog elements are designed having different lengths.

DETAILED DESCRIPTION

Figures 1, 2:
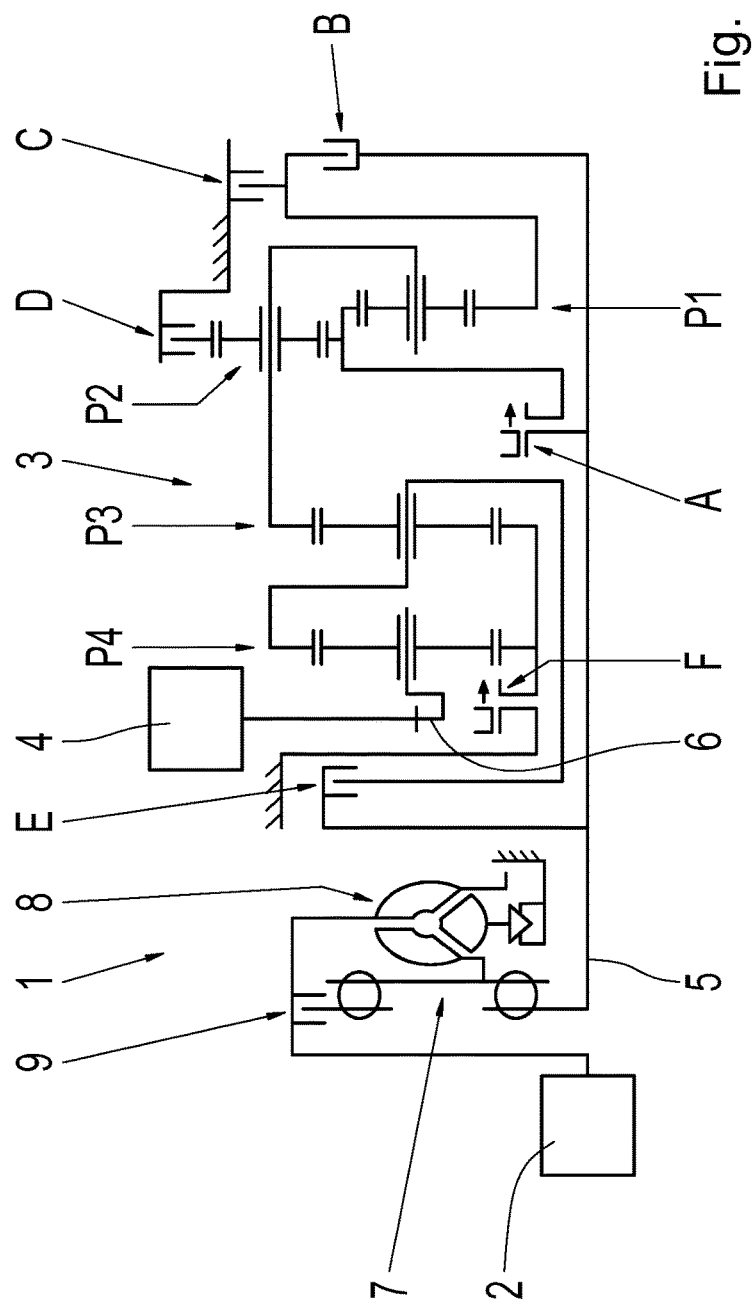
FIG. 1 shows a schematic of a vehicle drive train comprising a prime mover, comprising a transmission, and comprising a driven end.
FIG. 2 shows a shift logic, in table form, of the transmission shown in FIG. 1.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

FIG. 1 shows a schematic of a vehicle drive train 1 that includes a prime mover 2, a transmission 3, and a driven end 4. The prime mover 2 is an internal combustion engine in this case. The transmission 3 is an automatic transmission, in which multiple gears "1" through "9" for forward travel and at least one gear "R" for travel in reverse are implementable. Depending on the particular configuration of the vehicle drive train 1, the driven end 4 includes one, two, or more drivable vehicle axles, to which the torque of the prime mover 2 is applicable via the transmission 3. The transmission 3 includes a first hydraulically actuatable shift element A, a second hydraulically actuatable shift element B, a third hydraulically actuatable shift element C, a fourth hydraulically actuatable shift element D, a fifth hydraulically actuatable shift element E, and a sixth hydraulically actuatable shift element F. Hydraulically actuatable shift elements A through F are actuated during a ratio change in the transmission 3, i.e., during upshifts or downshifts. The ratio changes are to be carried out essentially without an interruption of tractive force, in combination with a high level of ride comfort and at a desired level of performance. The term "performance" is understood to mean, in each case, a ratio change in the transmission 3 that is implemented within a defined operating time.

In order to be able to carry out the particular demanded gear shift to the desired extent, shift elements A through F are each acted upon by shift sequences stored in a transmission control unit and a shift pressure corresponding to the particular shift sequence.

The transmission 3 includes a transmission input shaft 5 and a transmission output shaft 6. The transmission output shaft 6 is connected to the driven end 4. In the present case, a torsion damper 7 and, as a starting component, a hydrodynamic torque converter 8 including an associated torque converter lockup clutch 9 are arranged between the transmission input shaft 5 and the prime mover 2.

In addition, the transmission 3 includes four planetary gear sets P1 through P4, in particular a first planetary gear set P1, a second planetary gear set P2, a third planetary gear set P3, and a fourth planetary gear set P4. The first planetary gear set P1 and the second planetary gear set P2, which are preferably designed as minus planetary gear sets, form a shiftable front-mounted gear set. The third planetary gear set P3 and the fourth planetary gear set P4 represent a main gear set. The shift elements C, D, and F of the transmission 3 are designed as brakes, while the shift elements A, B, and E represent separating clutches.

A selective shifting of the gear stages "1" through "R" can be implemented with the aid of the shift elements A through F according to the shift logic represented in greater detail in FIG. 2. In order to establish a power flow in the transmission, essentially three of the shift elements A through F are to be transferred into or held in an engaged operating condition essentially simultaneously in each case.

The shift elements A and F are designed, in this case, as form-locking shift elements without additional synchronization. As a result, in the case of the transmission 3, as compared to transmissions including only friction-locking shift elements, drag torques caused by disengaged friction-locking shift elements are reduced.

As is known, form-locking shift elements are generally transferable out of a disengaged operating condition into an engaged operating condition only within a very narrow differential speed range, encompassing the synchronous speed, between the shift-element halves to be brought into an operative connection with one another in a form-locking manner. If the synchronization of a form-locking shift element to be engaged cannot be carried out with the aid of additional structural embodiments, the synchronization is implemented via an appropriate actuation of the further friction-locking shift elements contributing to the gear shift and/or a so-called engine override. During such an engine override, for example, the drive torque made available by the prime mover 2 is varied in the coasting condition as well as in the traction operation of the vehicle drive train 1 to the extent necessary for the synchronization. This also applies for the actuation of the friction-locking shift elements during the carrying-out of demanded traction or coasting shifts.

FIG. 3a through FIG. 3e each show two shift-element halves 10, 11 of the form-locking shift element A through F in various operating conditions. FIG. 3a shows the completely disengaged operating condition of the form-locking shift element A through F, in which there is no positive engagement between the two shift-element halves 10 and 11 and in which the shift-element halves 10 and 11 are spaced apart from each other in the axial direction x.

The shift-element halves 10 and 11 include dog elements 10A and 11A, respectively. The dog elements 10A and 11A can be brought into engagement with one another in a form-locking manner depending on the particular current application via axial displacement of the shift-element half 10 and/or of the shift-element half 11 relative to the shift-element half 11 or the shift-element half 10, respectively, in order to be able to transmit a torque present at the form-locking shift element A or F to the desired extent.

In the presence of an appropriate demand to engage the form-locking shift element A or F, an appropriate actuation force is applied in the engagement direction at the particular displaceably designed shift-element half 10 or 11. As a result, the axial distance between the end faces 10B and 11B of the dog elements 10A and 11A, respectively, facing one another is increasingly reduced.

If the differential speed between the shift-element halves 10 and 11 is too great, the dog elements 10A and 11A cannot be brought into engagement with one another in a form-locking manner. In such a case, a rattling occurs, during which the dog elements 10A and 11A glide off of one another, at their facing end faces 10B and 11B, in the circumferential direction of the shift-element halves 10 and 11 to the extent shown in FIG. 3b. Such a rattling is undesirable, however, since it causes irreversible damage in the area of the dog elements 10A and 11A as the period of operation increases.

For this reason, the differential speed between the shift-element halves 10 and 11 is adjusted to values within a differential speed window, which encompasses the synchronous speed of the form-locking shift element A or F, via appropriate actuation of the particular friction-locking shift elements B through E contributing to the operating condition change in the transmission 3. Within this differential speed window, the dog elements 10A and 11A of the shift-element halves 10 and 11, respectively, can be brought into engagement with each other in a form-locking manner to the desired extent.

It should be noted, however, that the positive engagement to be established can be prevented by a so-called tooth-on-tooth position between the shift-element halves 10 and 11.

The tooth-on-tooth position, as represented in FIG. 3c, is characterized in that the dog elements 10A and 11A rest against one another in the area of their end faces 10B and 11B, respectively, and the differential speed between the shift-element halves 10 and 11 is zero. During such a tooth-on-tooth position of the form-locking shift element A or F, the static friction between the end faces 10B and 11B of the dog elements 10A and 11A, respectively, is so great that the torque present at the form-locking shift element A or F is transmitted via the form-locking shift element A or F without the tooth-on-tooth position being released or unmeshed.

In order to release the tooth-on-tooth position, it is advantageous if the actuation force acting on the form-locking shift element A or F in the engagement direction is reduced and/or the torque present at the form-locking shift element A or F is increased. The static friction in the area between the end faces 10B and 11B of the dog elements 10A and 11A, respectively, is lowered via the reduction of the engagement force. Simultaneously, by raising the torque present at the form-locking shift element A or F, the static friction between the end faces 10B and 11B is overcome and the differential speed between the shift-element halves 10 and 11 increases to an extent that enables the positive engagement between the dog elements 10A and 11A to be established.

FIG. 3d shows an operating condition of the form-locking shift element A or F, in which a positive engagement between the shift-element halves 10 and 11 is present with a so-called partial overlap of the dog elements 10A and 11A. Such an operating condition is present during a disengagement process as well as during an engagement process of the form-locking shift element A or F.

The torque acting on the shift element A or F and the coefficients of friction of the flanks 10C and 11C yield a static friction force, which acts between the flanks 10C, 11C. If the actuation force acting on the shift-element halves 10 and 11 in the disengagement direction or in the engagement direction of the form-locking shift element A or F is too low in relation to the static friction force between the flanks 10C and 11C of the dog elements 10A and 11A, respectively, flank clamping occurs. During such a flank clamping, the axial relative actuating movement between the shift-element halves 10 and 11 in the engagement direction or in the disengagement direction is zero, and so the demanded operating condition change of the form-locking shift element A or F does not take place. In order to prevent or release such a flank clamping, the actuation force acting on the shift element A or F, for example, is raised and/or the particular torque present at the form-locking shift element A or F is reduced to the extent necessary for this purpose.

The completely engaged operating condition of the form-locking shift element A or F is represented in FIG. 3e, in which the full overlap between the dog elements 10A and 11A in the axial direction x is present.

FIG. 4a through FIG. 4f each show a representation of the form-locking shift element A or F corresponding to FIG. 3a. In the case of the shift element A or F, the dog elements 10A and 11A of the shift-element halves 10 and 11, respectively, which are arranged next to one another in the circumferential direction of the shift-element halves 10 and 11, each have a different length in the axial direction x. In the following, the longer dog elements are described in greater detail with reference to reference numbers 10A1 and 11A1 and the shorter dog elements are described in greater detail with reference to reference numbers 10A2 and 11A2.

This embodiment of the form-locking shift elements A and F offers the advantage that the positive engagement between the shift-element halves 10 and 11 can be established at higher differential speeds between the shift-element halves 10 and 11 than is the case with the embodiment of the form-locking shift elements A and F represented in FIG. 3a through FIG. 3e. In contrast thereto, the embodiment of the form-locking shift element A or F according to FIG. 4a through FIG. 4f is less robust against rattling as compared to the embodiment of the form-locking shift element A and F according to FIG. 3a through FIG. 3e.

The shift element A or F can have further operating conditions, due to the dog elements 10A1, 10A2 as well as 11A1 and 11A2 designed having different lengths, in addition to the operating conditions of the form-locking shift element A or F described with reference to FIG. 3a through FIG. 3e. The further operating conditions will be described in greater detail in the following description of FIG. 4a through FIG. 4f.

Initially, the completely disengaged operating condition of the shift element A or F is represented in FIG. 4a. FIG. 4b shows the operating condition of the form-locking shift element A or F during a rattling operation. During the rattling operation, the shift-element halves 10 and 11 glide off of one another, in the area of the end faces 10B1 and 11B1 of the longer dog elements 10A1 and 11A1, respectively, in the circumferential direction. Therefore, the positive engagement between the shift-element halves 10 and 11 cannot be established. This rattling operation can be prevented or ended to the extent described with reference to FIG. 3b by reducing the differential speed between the shift-element halves 10 and 11.

Moreover, FIG. 4c and FIG. 4d each show a tooth-on-tooth position, which prevents the establishment of the positive engagement between the shift-element halves 10 and 11. In the operating condition of the form-locking shift element A or F represented in FIG. 4c, the tooth-on-tooth position is between the end faces 10B1 and 11B1 of the longer dog elements 10A1 and 11A1, respectively. In contrast thereto, the tooth-on-tooth position between the shift-element halves 10 and 11 in the operating condition of the form-locking shift element A or F represented in FIG. 4d is between the end faces 11B1 of the longer dog elements 11A1 of the shift-element half 11 and the end faces 10B2 of the shorter dog elements 10A2 of the shift-element half 10.

Regardless thereof, the particular tooth-on-tooth position between the shift-element halves 10 and 11 can be released or prevented in the way described with respect to FIG. 3c.

FIG. 4e shows an intermediate operating condition of the form-locking shift element A or F between the completely disengaged operating condition and the completely engaged operating condition of the form-locking shift element A or F. During this intermediate operating condition, the flank clamping—which is described in greater detail above—between the dog elements 10A1, 10A2 and the dog elements 11A1, 11A2, respectively, can occur. The flank clamping can be prevented or released to the extent described with reference to FIG. 3d in order to be able to disengage or engage the form-locking shift element A or F to the demanded extent.

The completely engaged operating condition of the form-locking shift element A or F is represented in FIG. 4f.

If a malfunction of one of the sensors or of both sensors is determined on the basis of the signal of the sensor that is associated with the form-locking shift element A and/or on the basis of the signal of the sensor that is associated with the form-locking shift element F, a test routine is started. With the aid of the test routine, the operating condition of the shift element A or F or of both shift elements A and F existing before the determination of the malfunction of the sensor or sensors is determined. For the sake of clarity, the carrying-out of the test routine is described in greater detail in the following only with reference to the form-locking shift element A, since the check of the operating condition of the further form-locking shift element F takes place in the same way as for the shift element A.

Initially, upon detection of a malfunction of the sensor that is associated with the shift element A, a check is carried out with the aid of the test routine to determine whether the shift-element half 10, before the malfunction, was in an end position as demanded and was actuated with the aid of an actuation force acting in the direction of this end position. In the event of a positive test result, the power flow in the transmission 3 is maintained for as long as it takes for the shift-element half 10, starting from its current end position, to be actuated in the direction of the other end position and/or for the actuation force acting in the direction of its current end position to be less than a threshold value. In the event of a negative test result, the power flow in the transmission 3 is interrupted. For this purpose, all shift elements A through F are transferred into their disengaged operating condition, in order to reliably prevent a possible erroneous control of the transmission 3.

On the basis of the logic of the test routine, in the presence of an electrical malfunction of the sensor of the shift element A, a decision is made, depending on the situation, regarding which information can be gathered from the signal of the sensor and whether the transmission 3 is to be completely disengaged for this reason. If the shift-element half 10 is in one of the two end positions at the point in time at which the electrical malfunction of the sensor occurs, the shift-element half 10 is additionally actuated in the direction of the appropriate end position and, if the actuation force acting in the direction of the current end position is sufficiently great to hold the shift-element half 10 in the end position, the transmission 3 is not disengaged. The transmission 3 is completely disengaged only for the case in which a demand is present, according to which the shift-element half 10 is to be moved out of the current end position or in which the actuation force present at the shift-element half 10 falls below a threshold value.

The latter-mentioned result is present, for example, for the case in which the hydraulic pump of the transmission 3, which provides the actuating pressure for the shift element A, is no longer sufficiently supplied with torque by the prime mover 2.

Modifications and variations can be made to the embodiments illustrated or described herein without departing from the scope and spirit of the invention as set forth in the appended claims. In the claims, reference characters corresponding to elements recited in the detailed description and the drawings may be recited. Such reference characters are enclosed within parentheses and are provided as an aid for reference to example embodiments described in the detailed description and the drawings. Such reference characters are provided for convenience only and have no effect on the scope of the claims. In particular, such reference characters are not intended to limit the claims to the particular example embodiments described in the detailed description and the drawings.

REFERENCE NUMBERS 1 vehicle drive train
2 prime mover
3 transmission
4 driven end
5 transmission input shaft
6 transmission output shaft
7 torsion damper
8 hydrodynamic torque converter
9 torque converter lockup clutch
10, 11 shift-element half
10A, 10A1, 10A2 dog element
11A, 11A1, 11A2 dog element
10B, 10B1, 10B2 end face of the dog element
10C flank of the dog element
11B, 11B1, 11B2 end face of the dog element
11C flank of the dog element
"1" to "9" transmission ratio for forward driving
A to F shift element
P1 to P4 planetary gear set
"R" transmission ratio for travel in reverse

The invention claimed is:

1. A method for operating a transmission (3) that comprises at least one form-locking shift element (A, F) with two shift-element halves (10, 11), at least one shift-element half (10) displaceable between a first end position and a second end position, the form-locking shift element (A, F) disengaged in the first end position and engaged in the second end position, actuating travel of the at least one shift-element half (10) detectable with a sensor, a power flow in the transmission (3) interruptible when a malfunction of the sensor is detected, the method comprising:

upon detection of the malfunction of the sensor, determining whether the at least one shift-element half (10) was in a demanded end position before the malfunction and was actuated by an actuation force towards the demanded end position before the malfunction; and in response to determining that the at least one shift-element half (10) was in the demanded end position and was actuated by the actuation force towards the demanded end position before the malfunction, maintaining the power flow in the transmission (3) until the at least one shift-element half (10) is actuated from a current end position towards the other end position and/or until the actuation force acting towards the current end position is less than a threshold value.

2. The method of claim 1, wherein the malfunction of the sensor is detected when a signal of the sensor has values that are outside a value range, values of the value range corresponding to an overall actuating-travel range of the at least one shift-element half (10) between the first and second end positions.

3. The method of claim 1, wherein the signal of the sensor is a pulse-width modulated signal.

4. The method of claim 1, further comprising interrupting the power flow in the transmission (3) when the malfunction of the sensor persists for longer than a predefined time period.

5. The method of claim 1, wherein the actuation force corresponds to a hydraulic pressure from a hydraulic pump driven by a prime mover (2) of a vehicle drive train (1), the method further comprising interrupting the power flow in the transmission (3) when a drive torque of the prime mover (2) is less than a threshold value.

6. A control unit for operating a transmission (3) that comprises at least one form-locking shift element (A, F) with two shift-element halves (10, 11), at least one shift-element half (10) displaceable between a first end position and a second end position, the form-locking shift element (A, F) disengaged in the first end position and engaged in the second end position, actuating travel of the at least one shift-element half (10) detectable with a sensor, a power flow in the transmission (3) interruptible when a malfunction of the sensor is detected, the control unit configured for:

upon detection of the malfunction of the sensor, determining whether the at least one shift-element half (10) was in a demanded end position before the malfunction and was actuated by an actuation force towards the demanded end position before the malfunction; and in response to determining that the at least one shift-element half (10) was in the demanded end position and was actuated by the actuation force towards the demanded end position before the malfunction, maintaining the power flow in the transmission (3) until the at least one shift-element half (10) is actuated from a current end position towards the other end position and/or until the actuation force acting towards the current end position is less than a threshold value.

7. A control unit configured to implement the method of claim 1 on a control side.

8. A computer program comprising program code stored on a non-transitory computer-readable medium with software instructions to carry out the method of claim 1 when executed on a control unit.

* * * * *